United States Patent
Lee et al.

(10) Patent No.: US 9,734,115 B2
(45) Date of Patent: Aug. 15, 2017

(54) MEMORY MAPPING METHOD AND MEMORY MAPPING SYSTEM

(71) Applicant: Industrial Technology Research Institute, Hsinchu (TW)

(72) Inventors: Chao-Tang Lee, Pingtung County (TW); Cheng-Chun Tu, Hsinchu (TW); Tzi-Cker Chiueh, Taipei (TW); Shu-Hao Hsu, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 318 days.

(21) Appl. No.: 14/543,906

(22) Filed: Nov. 18, 2014

(65) Prior Publication Data
US 2016/0140074 A1    May 19, 2016

(51) Int. Cl.
*G06F 13/00*    (2006.01)
*G06F 13/36*    (2006.01)
*G06F 13/42*    (2006.01)
*G06F 13/40*    (2006.01)

(52) U.S. Cl.
CPC ........ *G06F 13/4221* (2013.01); *G06F 13/404* (2013.01); *G06F 13/4022* (2013.01)

(58) Field of Classification Search
None
See application file for complete search history.

(56) References Cited

U.S. PATENT DOCUMENTS

| 6,253,334 B1 * | 6/2001 | Amdahl ............... G06F 1/20 709/239 |
| 7,676,625 B2 | 3/2010 | Cassiday et al. |
| 8,521,941 B2 | 8/2013 | Regula |

(Continued)

FOREIGN PATENT DOCUMENTS

| CN | 101710314 | 2/2013 |
| TW | 201015336 | 4/2010 |

(Continued)

OTHER PUBLICATIONS

John Byrne, et al., "Power-Efficient Networking for Balanced System Designs: Early Experiences with PCIe," Proceeding HotPower '11 Proceedings of the 4th Workshop on Power-Aware Computing and Systems, Article No. 3, Oct. 2011, pp. 1-5.

(Continued)

*Primary Examiner* — Michael Sun
(74) *Attorney, Agent, or Firm* — Jianq Chyun IP Office (57) ABSTRACT

A memory mapping method for coupling a plurality of servers with a PCI express bus is disclosed. The method comprises: configuring an extended memory address on a management host having a memory address; mapping the extended memory address of the management host corresponding to each of the servers to memory addresses of each of the servers respectively by a plurality of non-transparent bridges of the PCI express bus; configuring an extended memory address on each of the servers; and mapping the extended memory address of each of the servers to the memory address and the extended memory address of the management host by the non-transparent bridges, the extended memory address of each of the servers corresponding to the servers and the management host.

16 Claims, 7 Drawing Sheets

(56) References Cited

U.S. PATENT DOCUMENTS

| | | | |
|---|---|---|---|
| 8,995,302 B1* | 3/2015 | Brown | H04L 49/00 370/254 |
| 2008/0052443 A1 | 2/2008 | Cassiday et al. | |
| 2011/0131373 A1 | 6/2011 | Kumar et al. | |
| 2011/0202701 A1 | 8/2011 | Maitra | |
| 2012/0166690 A1* | 6/2012 | Regula | G06F 13/404 710/104 |
| 2013/0332660 A1* | 12/2013 | Talagala | G06F 12/0246 711/103 |
| 2015/0293881 A1* | 10/2015 | Raikin | G06F 12/1072 709/212 |

FOREIGN PATENT DOCUMENTS

| | | |
|---|---|---|
| TW | 201411358 | 3/2014 |
| TW | 201423422 | 6/2014 |

OTHER PUBLICATIONS

John Gudmundson, "Enabling Multi-Host System Designs with PCI Express Technology," May 2004, Available at: www.plxtech.com/pdf/technical/expresslane/RTC_Enabling%20MulitHostSystemDesigns.pdf.

Jack Regula, "Using Non-transparent Bridging in PCI Express Systems," Jun. 2004, Available at: www.plxtech.com/pdf/technical/expresslane/NontransparentBridging.pdf.

David Mayhew, et al., "PCI Express and Advanced Switching: Evolutionary Path to Building Next Generation Interconnects," 11th Symposium on High Performance Interconnects, Aug. 20-22, 2003, pp. 21-29.

"Office Action of Taiwan Counterpart Application", issued on Jun. 21, 2016, p. 1-p. 11.

* cited by examiner

MEMORY MAPPING METHOD AND MEMORY MAPPING SYSTEM

TECHNICAL FIELD

The present disclosure generally relates to a memory mapping method for coupling a plurality of servers with a PCI express bus and a memory mapping system thereof.

BACKGROUND

Several different computer I/O interconnect standards are developed for connecting computer elements. One of the most popular computer I/O interconnect standards over the years is the Peripheral Component Interconnect (PCI) standard. The PCI allows the bus to act like a bridge, which isolates a local processor bus from the peripherals, allowing a Central Processing Unit (CPU) of the computer to run must faster. Recently, a successor to PCI has been popularized, termed PCI Express (or, simply PCIe). The PCIe provides higher performance, increased flexibility and scalability for next-generation systems while maintaining software compatibility with existing PCI applications.

Compared to legacy PCI, the PCIe Express protocol with three layers (a transaction layer, a data link layer and a physical layer) is considerably more complex. In the transaction layer, PCIe implements split transactions with request and response separated by time, allowing the link to carry other traffic while the target device gathers data for the response. The data link layer sequences the Transaction Layer Packets (TLPs) that are generated by the transaction layer, ensures reliable delivery of TLPs between two endpoints via an acknowledgement protocol that explicitly requires replay of unacknowledged/bad TLPs, and initializes and manages flow control credits. The physical layer specification is divided into a two sublayers, corresponding to electrical and logical specifications.

In a PCIe system, a root complex device connects the processor and memory subsystem to the PCIe switch fabric comprised of one or more switch devices. In PCIe, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may maintain more than one PCIe port and multiple switch devices can be connected to the ports on the root complex or cascaded.

An existing solution Non-Transparent Bridge (NTB) is described that uses memory redirection methods when multiple hosts are connected using the non-transparent ports of a PCIe switch. Normally, the NTB is presented with two back-to-back endpoints, each endpoint handles memory map and translation function of one direction, so the NTB can do the memory redirection function in two ways between two hosts connected through the NTB.

Figure 1:
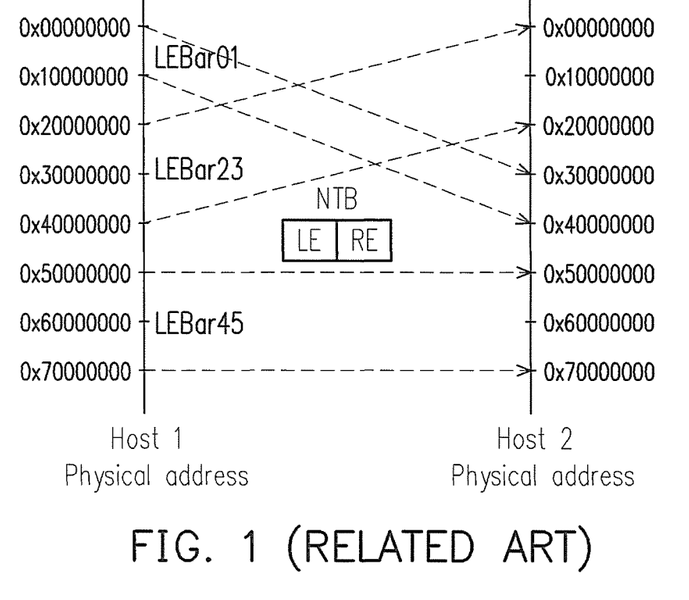
FIG. 1 is a diagram illustrating a memory mapping system for mapping the physical address of host 1 to physical address of host 2 through an endpoint of the NTB according to the prior art.

FIG. 1 is a diagram illustrating a memory mapping system for mapping the physical address of host 1 to physical address of host 2 through an endpoint of the NTB.

In FIG. 1, the left endpoint LE of the NTB has 6 Base Address Registers (BARs) LEBar 0~LEBar 5 and supports 6 addresses mapping of 32 bits address. For example, the LEBar (left end base address register) 0 and the LEBar 1 map the physical address 0x00000000~0x10000000 of host 1 to the physical address 0x30000000~0x40000000 of host 2, the LEBar 2 and the LEBar 3 map the physical address 0x20000000~0x40000000 of host 1 to the physical address 0x00000000~0x20000000 of host 2, and the LEBar 4 and the LEBar 5 map the physical address 0x50000000~0x70000000 of host 1 to the physical address 0x50000000~0x70000000 of host 2.

Figure 2:
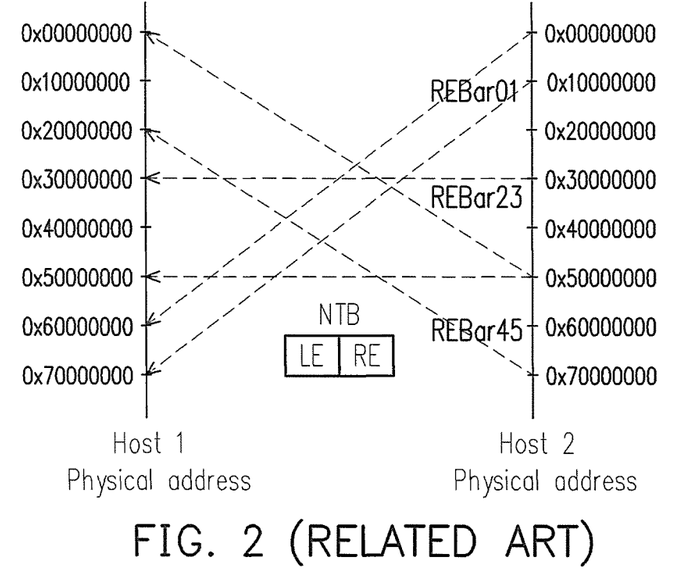
FIG. 2 is a diagram illustrating a memory mapping system for mapping the physical address of host 2 to physical address of host 1 through an endpoint of the NTB according to the prior art.

FIG. 2 is a diagram illustrating a memory mapping system for mapping the physical address of host 2 to physical address of host 1 through an endpoint of the NTB. In FIG. 2, the right endpoint RE of the NTB has 6 BARs, REBar 0~REBar 5, and supports 6 addresses mapping of 32 bits address. Similar to FIG. 1, the REBar 0 to REBar 5 map the physical address of host 2 to the physical address of host 1. Each PCIe endpoint has only 6 Bars and supports maximum 6 addresses mapping of 32 bits address or 3 addresses mapping of 64 bits address, and therefore, the number of BARs is the most critical resource of the NTB function.

SUMMARY

Accordingly, the present disclosure provides a memory mapping method and system thereof that utilizes the PCIe interface and the memory address translation function of the NTB to construct a global memory address mapping system in which inter-host communication or sharing of virtual functions may be accomplished by NTB function.

According to an exemplary embodiment of the present disclosure, a memory mapping method for coupling a plurality of servers with a PCI express bus is provided. The method includes configuring an extended memory address on a management host having a memory address. The method also includes mapping the extended memory address of the management host corresponding to each of the servers to memory addresses of each of the servers respectively by a plurality of non-transparent bridges of the PCI express bus. The method further includes configuring an extended memory address on each of the servers. The method also includes mapping the extended memory address of each of the servers to the memory address and the extended memory address of the management host by the non-transparent bridges, the extended memory address of each of the servers corresponding to the servers and the management host.

According to an exemplary embodiment of the present disclosure, a memory mapping system is provided. The memory mapping system includes a management host, a plurality of servers coupled to the management host through a PCI express bus, and a plurality of non-transparent bridges on the PCI express bus. The plurality of non-transparent bridges couple the servers to the management host. An extended memory address is configured on the management host having a memory address. The extended memory address of the management host corresponding to each of the servers is mapped to memory addresses of each of the servers respectively by a plurality of non-transparent bridges of the PCI express bus. An extended memory address is configured on each of the servers. The extended memory address of each of the servers are mapped to the memory address and the extended memory address of the management host by the non-transparent bridges, the extended memory address of each of the servers corresponding to the servers and the management host.

Based on the above description, the plurality of servers may share the virtual function of SR-IOV devices and communicate with each other with a global memory address mapping using only one BAR of each NTB function while utilizing the most bandwidth of the PCIe bus.

It should be understood, however, that this Summary may not contain all of the aspects and exemplary embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Reference will now be made in detail to the present exemplary embodiments of the invention, examples of which are illustrated in the accompanying drawings. Wherever possible, the same reference numbers are used in the drawings and the description to refer to the same or like parts.

Exemplary embodiments of the present disclosure may comprise any one or more of the novel features described herein, including in the Detailed Description, and/or shown in the drawings. As used herein, "at least one," "one or more" and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 3:
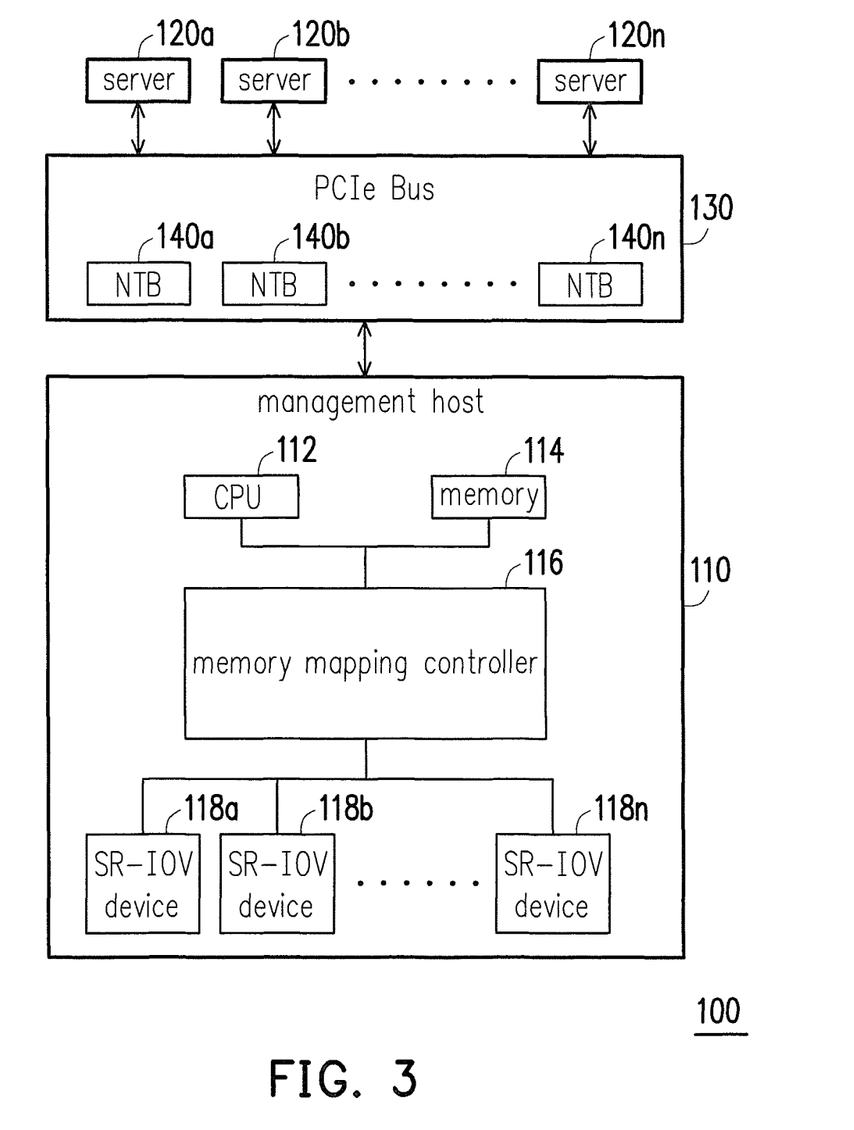
FIG. 3 is a block diagram illustrating the memory mapping system 100 according to an exemplary embodiment of the present disclosure

FIG. 3 is a block diagram illustrating the memory mapping system 100 according to an exemplary embodiment of the present disclosure.

Referring to FIG. 3, the memory mapping system 100 of the present disclosure includes a management host 110, a PCIe Bus 130, and a plurality of servers 120a~120n. The servers 120a~120n may couple to the management host 110 through the PCIe Bus 130. The non-transparent bridges (NTB) on the PCIe bus 130, (i.e., 140a~140n) performs memory address mapping between the management host 110 and the servers 120a~120n. Specifically, each of the NTB 140a~140n is presented with two endpoints, and each of the endpoints handles memory address mapping of one direction. The management host 110 includes a CPU 112, a memory 114, a memory mapping controller 116 and SR-IOV devices 118a~118n. The memory mapping controller 116 may control the memory address mapping between the management host 110 and the servers 120a~120n. The SR-IOV devices 118a~118n (e.g., Ethernet 10G adapter) may be plugged on the management host 110 and the virtual functions of the SR-IOV devices 118a~118n may be shared to the servers 120a~120n through the PCIe Bus 130.

In an exemplary embodiment, an endpoint of the NTB 140a may map the address space of the management host 110 to the server 120a through the PCIe Bus 130, while another endpoint of the NTB 140a may map the address space of the server 120a to the management host 110 through the PCIe Bus 130. In this manner, an access to the memory of the management host 110 may be directed to the mapped memory address of the server 120a, and an access to the memory of the server 120a may be directed to the mapped memory address of the management host 110.

It is worth noting that the memory mapping controller 116 may be implemented as a software module or program codes. For example, when a new server is detected on the PCIe bus, the program codes may be loaded into the memory 114 and executed by the CPU 112 such that the mapping information between the management host 110 and the servers is updated. However, the present disclosure is not limited thereto. The memory controller may also be implemented as a hardware circuit that controls the memory address mapping between the management host 110 and the servers 120a~120n.

Figure 4:
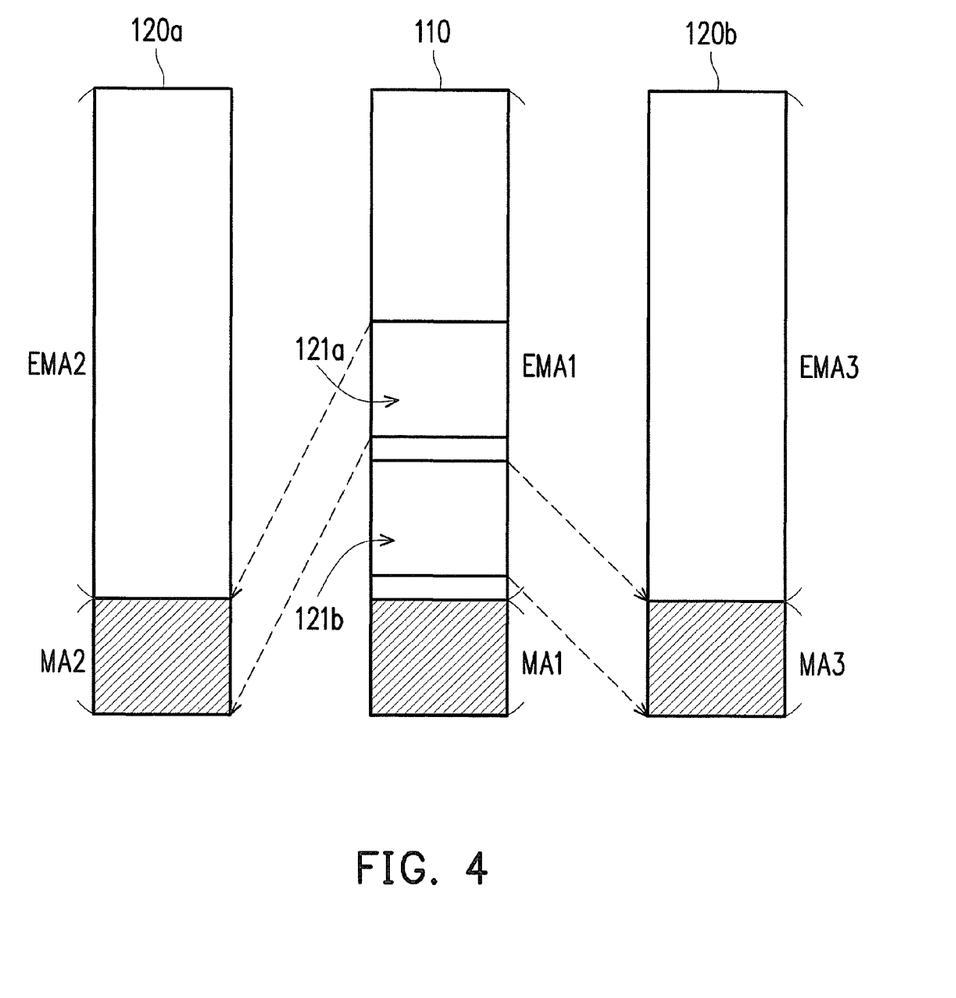
FIG. 4 is a diagram illustrating NTB address mapping from a management host 110 to the server 120a and the server 120b according to an exemplary embodiment of the present disclosure.

FIG. 4 is a diagram illustrating NTB address mapping from a management host 110 to the server 120a and the server 120b according to an exemplary embodiment of the present disclosure.

Referring to FIG. 3 and FIG. 4, the address space of the management host 110 is configured with a memory address MA1 and an extended memory address EMA1. The memory address MA1 may be the dynamic random access memory (DRAM) of the management host 110, and the extended memory address EMA1 may be the address space other than the memory address MA1 of the management host 110. In the extended memory address EMA1 of the management host 110, the block 121a and the block 121b may be configured to correspond to the server 120a and the server 120b, respectively. In an exemplary embodiment of the present disclosure, the block 121a on the extended memory address EMA1 of the management host 110 may be mapped to the memory address MA2 of the server 120a through an endpoint of the NTB140a on the PCIe Bus 130, and the block 121b on the extended memory address EMA1 of the management host 110 may be mapped to the memory address MA3 of the server 120b through an endpoint of the NTB 140b on the PCIe Bus 130. In this manner, an access to the block 121a on the extended memory address EMA1 of the management host 110 may be directed to the memory address MA2 of the server 120a though an endpoint of the NTB 140a on the PCIe Bus 130, and an access to the block 121b on the extended memory address EMA1 of the management host 110 may be directed to the memory address MA3 of the server 120b though an endpoint of the NTB 140b on the PCIe Bus 130.

Figure 5:
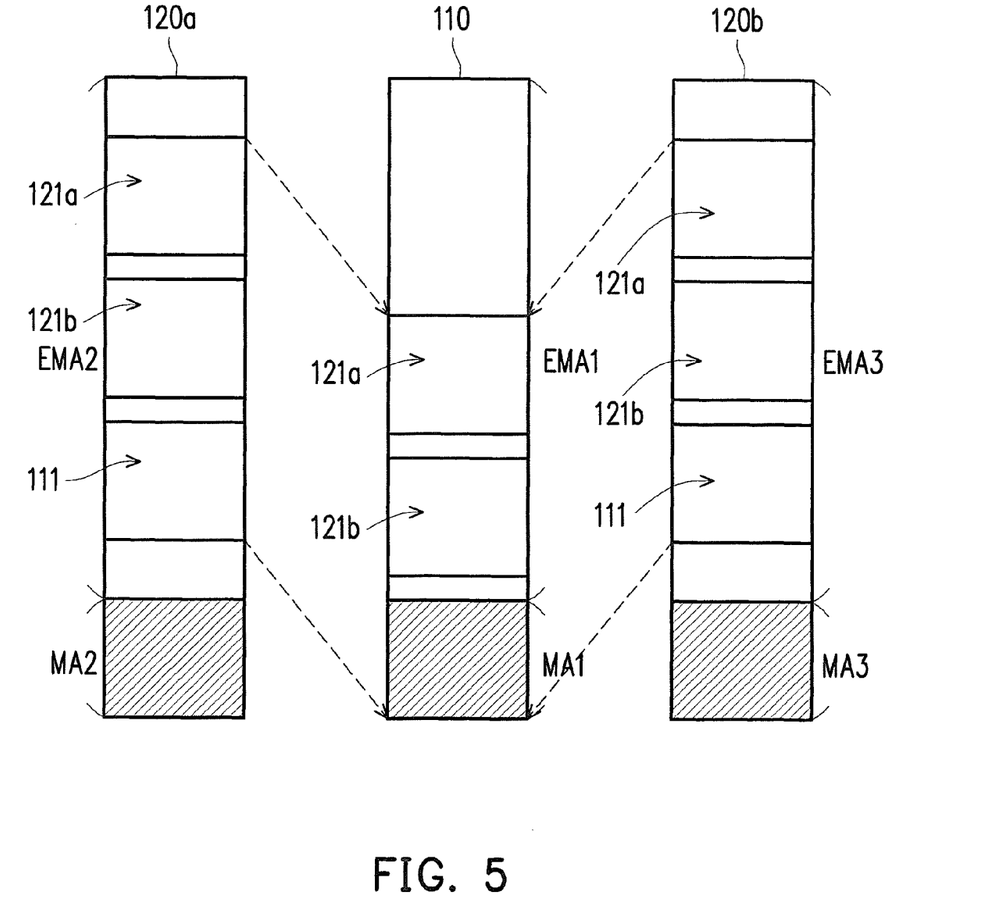
FIG. 5 is a diagram illustrating NTB address mapping from the server 120a and the server 120b to the management host 110 according to an exemplary embodiment of the present disclosure.

FIG. 5 is a diagram illustrating NTB address mapping from the server 120a and the server 120b to the management host 110 according to an exemplary embodiment of the present disclosure.

Referring to FIG. 3 and FIG. 5, the address space of the server 120a are configured with memory addresses MA2 and extended memory address EMA2, and the address space of the server 120b are configured with memory addresses MA3 and extended memory address EMA3. The memory addresses MA2 and MA3 may be respectively the dynamic random access memories (DRAM) of the server 120a and the server 120b, and the extended memory addresses EMA2 and EMA3 may be respectively the address space other than the memory address MA2 and MA3 of the server 120a and the server 120b. In the extended memory address EMA2 of the server 120a and the extended memory address EMA3 of the server 120b, block 121a, block 121b and block 111 may be configured to correspond to the server 120a, the server 120b and the management host 110 respectively. In an exemplary embodiment of the present disclosure, the block 121a and the block 121b on the extended memory address EMA2 and EMA3 of the server 120a and the server 120b may be mapped to the block 121a and the block 121b of the extended memory address EMA1 of the management host 110 through the endpoints of the NTB140a and NTB140b on the PCIe Bus 130, and the blocks 111 on the extended memory addresses EMA2 and EMA3 of the server 120a and the server 120b may be mapped to the memory address MA1 of the management host 110 through the endpoints of the NTB 140a and NTB 140b on the PCIe Bus 130.

In this manner, an access to the block 121a on the extended memory address EMA2 of the server 120a may be directed to the block 121a on the extended memory address EMA1 of the management host 110 though an endpoint of the NTB 140a on the PCIe Bus 130, an access to the block 121b on the extended memory address EMA2 of the server 120a may be directed to the block 121b of the extended memory address EMA1 of the management host 110 though an endpoint of the NTB 140a on the PCIe Bus 130, and an access to the block 111 on the extended memory address EMA2 of the server 120a may be directed to the memory address MA1 of the management host 110 though an endpoint of the NTB 140a on the PCIe Bus 130.

Similarly, an access to the block 121a on the extended memory address EMA3 of the server 120b may be directed to the block 121a on the extended memory address EMA1 of the management host 110 though an endpoint of the NTB 140b on the PCIe Bus 130, an access to the block 121b on the extended memory address EMA3 of the server 120b may be directed to the block 121b of the extended memory address EMA1 of the management host 110 though an endpoint of the NTB 140b on the PCIe Bus 130, and an access to the block 111 on the extended memory address EMA3 of the server 120b may be directed to the memory address MA1 of the management host 110 though an endpoint of the NTB 140b on the PCIe Bus 130.

Figure 6:
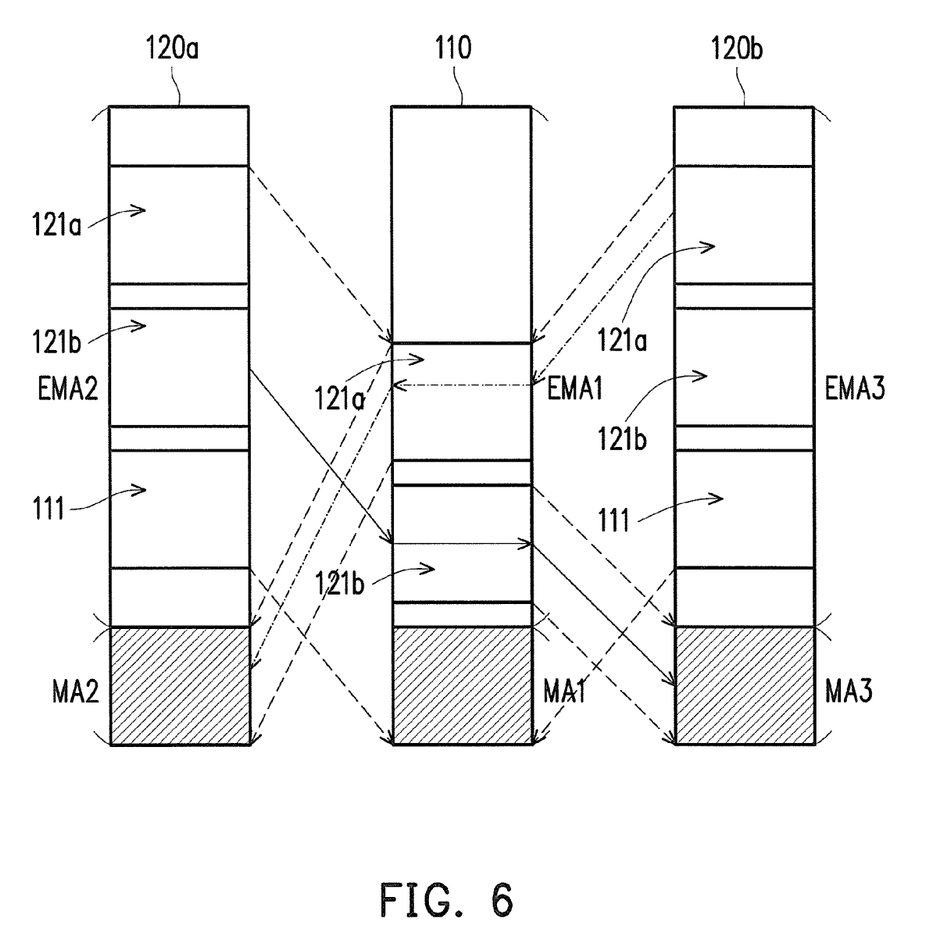
FIG. 6 is a diagram illustrating the memory access transfer path when the server 120a and the server 120b communicate with each other according to an exemplary embodiment of the present disclosure.

FIG. 6 is a diagram illustrating the memory access transfer path when the server 120a and the server 120b communicate with each other according to an exemplary embodiment of the present disclosure.

Referring to FIG. 3 and FIG. 6, when the server 120a intends to access the memory address MA3 of the server 120b, the server 120a accesses the block 121b on its own extended memory address EMA2, and the memory access will be transferred to the block 121b on the extended memory address EMA1 of the management host 110 through an endpoint of the NTB 140a (See FIG. 5). After the memory access is transferred to the block 121b on the extended memory address EMA1 of the management host 110, the memory access will be further transferred to the memory address MA3 of the server 120b through an endpoint of the NTB 140b (See FIG. 4). Similarly, when the server 120b intends to access the memory address MA2 of the server 120a, the server 120b accesses the block 121a on its own extended memory address EMA3, and the memory access will be transferred to the block 121a on the extended memory address EMA1 of the management host 110 through an endpoint of the NTB 140b. After the memory access is transferred to the block 121a on the extended memory address EMA1 of the management host 110, the memory access will be further transferred to the memory address MA2 of the server 120a through an endpoint of the NTB 140a.

It is worth noting that one BAR on a left endpoint of the NTB 140a may keep the information of mapping the block 121a in the extended memory address EMA2 of the server 120a to the block 121a in the extended memory address EMA1 of the management host 110, mapping the block 121b in the extended memory address EMA2 of the server 120a to the block 121b in the extended memory address EMA1 of the management host 110, and mapping the block 111 in the extended memory address EMA2 of the server 120a to the memory address MA1 of the management host 110. One BAR on a right endpoint of the NTB 140a may keep the information of mapping the block 121a in the extended memory address EMA1 of the management host 110 to the memory address MA2 of the server 120a.

Similarly, one BAR on a right endpoint of the NTB 140b may keep the information of mapping the block 121a in the extended memory address EMA3 of the server 120b to the block 121a in the extended memory address EMA1 of the management host 110, mapping the block 121b in the extended memory address EMA3 of the server 120b to the block 121b in the extended memory address EMA1 of the management host 110, and mapping the block 111 in the extended memory address EMA3 of the server 120b to the memory address MA1 of the management host 110. One BAR on a left endpoint of the NTB 140b may keep the information of mapping the block 121b in the extended memory address EMA1 of the management host 110 to the memory address MA3 of the server 120b.

Accordingly, the server 120a the server 120b are able to communicate with each other through a global memory address mapping system employing only one BAR at the endpoint of the NTB that stores the all the memory mapping information of the server 120a, the server 120b and the management host 110.

Figure 7:
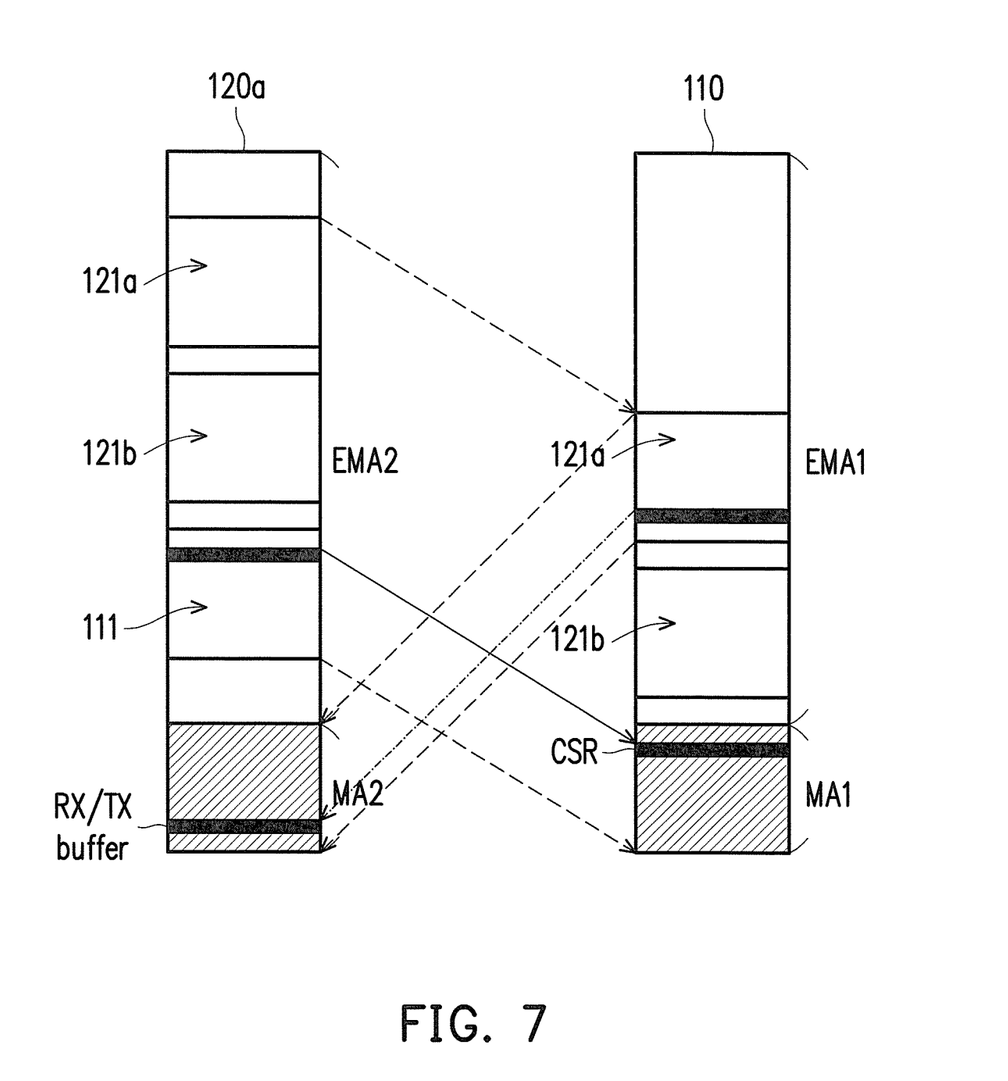
FIG. 7 is a diagram illustrating the memory access transfer path when a SR-IOV virtual function is shared to the server 120a from the management host 110 according to an exemplary embodiment of the present disclosure.

FIG. 7 is a diagram illustrating the memory access transfer path when a SR-IOV virtual function is shared to the server 120a from the management host 110 according to an exemplary embodiment of the present disclosure.

Referring to FIG. 3 and FIG. 7, when the driver of the server 120a intends to access the Control and Status Register (CSR) of the Virtual Function (VF) of the SR-IOV device, the server 120a accesses the section corresponding to the CSR in the block 111 on its own extended memory address EMA2, and the memory access will be transferred to the section corresponding to the CSR in the memory address MA1 of the management host 110 through an endpoint of the NTB 140a (See FIG. 5). After the section corresponding to the CSR in the memory address MA1 of the management host 110 is accessed, the virtual function accesses the section corresponding to the RX/TX buffer in the block 121a of the extended memory address EMA1 of the management host 110, and the memory access will be transferred to the section corresponding to the RX/TX buffer in the memory address MA2 of the server 120a through an endpoint of the NTB 140a (see FIG. 4). Accordingly, the interrupt of the virtual function is forwarded to the server 120a. In such a memory mapping system, the virtual function is able to operate in a zero-copy manner on the management host 110 and the servers.

It is worth noting that in FIG. 3 to FIG. 7, the global memory mapping structure in server 120a and server 120b includes block 121a, block 121b and block 111 that correspond to server 120a, server 120b and management host 110, respectively. However, the present disclosure is not limited thereto. The global memory mapping structure in the servers may include the number of blocks that equals to the num of the number of servers and the management host 110 in the extended memory address EMA1 of the servers, and therefore, only one base address register is required for each of the NTB function because all the mapping information can be recorded in one base address register. It is also to be understood that although there are only block 121a and block 121b in the extended memory address EMA1 of the management host 110 in FIG. 3 to FIG. 7, the present disclosure is not limited thereto. The global memory mapping structure in the management host 110 may include the number of blocks that equals to the number of servers in the extended memory address EMA1 of the management host 110.

Figure 8:
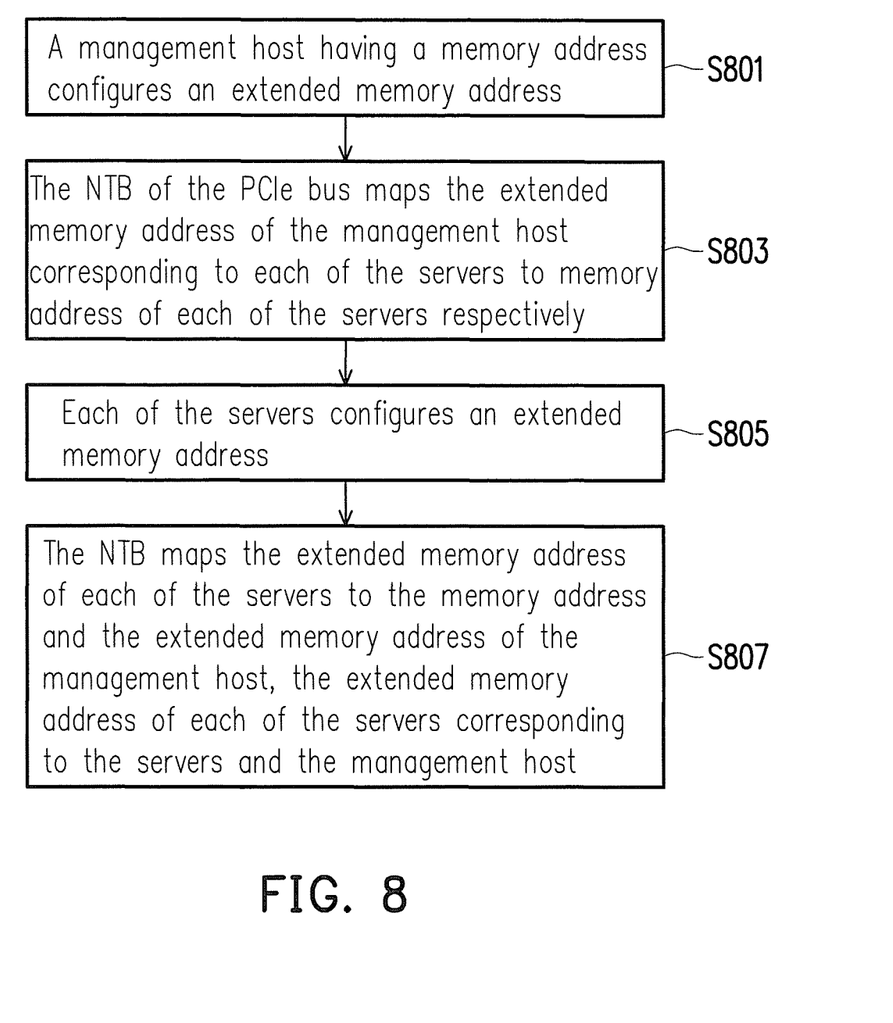
FIG. 8 is a flowchart illustrating the memory mapping method according to an exemplary embodiment of the present disclosure.

FIG. 8 is a flowchart illustrating the memory mapping method according to an exemplary embodiment of the present disclosure.

Referring to FIG. 8, in step S801, a management host having a memory address configures an extended memory address.

In step S803, the NTB of the PCIe bus maps the extended memory address of the management host corresponding to each of the servers to memory addresses of each of the servers respectively.

In step S805, each of the servers configures an extended memory address.

In step S807, the NTB maps the extended memory addresses of each of the servers to the memory address and the extended memory address of the management host, the extended memory address of each of the servers corresponding to the servers and the management host.

As described above, the memory mapping method of the present disclosure constructs a global memory mapping structure in the servers and the management host such that the servers may share the virtual function of SR-IOV devices and communicate with each other with a global memory address mapping using only one BAR of each NTB function while utilizing the most bandwidth of the PCIe bus. The previously described exemplary embodiments of the present disclosure have the advantages aforementioned, wherein the advantages aforementioned not required in all versions of the invention.

It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

What is claimed is:

1. A memory mapping method for coupling a plurality of servers with a PCI express bus, comprising:
configuring an extended memory address on a management host having a memory address, wherein the memory address is a physical address of the management host;
for each of the servers, mapping a portion of the extended memory address of the management host corresponding to each of the servers to memory addresses of each of the servers by a plurality of non-transparent bridges of the PCI express bus, wherein the memory address of the servers is a physical address of the servers;
configuring an extended memory address on each of the servers; and
for each of the servers, mapping a first portion of the extended memory address of each of the servers corresponding to the management host to the memory address of the management host and mapping a plurality of second portions of the extended memory address of each of the servers corresponding to the servers to the extended memory address of the memory host by only one of a plurality of base address registers (BARs) of the non-transparent bridges of the PCI express bus.

2. The method of claim 1, further comprising:
accessing a control and status register (CSR) of a virtual function in the memory address of the management host through the extended memory address of a first server among the servers corresponding to the memory address of the management host.

3. The method of claim 2, further comprising:
accessing a RX/TX buffer of the virtual function in the memory address of the first server through the extended memory address of the management host corresponding to the memory address of the first server.

4. The method of claim 1, further comprising:
accessing the memory address of a second server among the servers through the extended memory address of the management host by a first server among the servers.

5. The method of claim 4, wherein the step of accessing the memory address of the second server through the extended memory address of the management host by the first server comprises:
accessing the extended memory address of the management host corresponding to the second server through the extended memory address of the first server corresponding to the second server.

6. The method of claim 5, wherein the step of accessing the memory address of the second server through the extended memory address of the management host by the first server further comprises:
accessing the memory address of the second server through the extended memory of the management host corresponding to the second server.

7. The method of claim 1, wherein each of the non-transparent bridges comprises two endpoints, and each of the two endpoints comprises the plurality of base address registers.

8. The method of claim 2, wherein
the virtual function operates in a zero-copy manner on the management host and the servers.

9. A memory mapping system, comprising:
a management host;

a plurality of servers coupled to the management host through a PCI express bus; and a plurality of non-transparent bridges on the PCI express bus, coupling the servers to the management host, wherein an extended memory address is configured on the management host having a memory address, wherein the memory address is a physical address of the management host, wherein, for each of the servers, a portion of the extended memory address of the management host corresponding to each of the servers are mapped to memory addresses of each of the servers by the plurality of non-transparent bridges of the PCI express bus, wherein the memory address of the servers is a physical address of the servers, wherein an extended memory address is configured on each of the servers, wherein, for each of the servers, a first portion of the extended memory address of each of the servers corresponding to the management host are mapped to the memory address of the management host and a plurality of second portions of the extended memory address of each or the servers corresponding to the servers are mapped to the extended memory address of the memory host by only one of a plurality of base address registers (BARs) of the non-transparent bridges of the PCI express bus.

10. The system of claim 9, wherein a first server among the servers accesses a control and status register (CSR) of a virtual function in the memory address of the management host through the extended memory address of the first server corresponding to the memory address of the management host.

11. The system of claim 10, wherein the virtual function accesses a RX/TX buffer of the virtual function in the memory address of the first server through the extended memory address of the management host corresponding to the memory address of the first server.

12. The system of claim 9, wherein a first server among the servers accesses the memory address of a second server among the servers through the extended memory address of the management host.

13. The system of claim 12, wherein the first server accesses the extended memory address of the management host corresponding to the second server through the extended memory address of the first server corresponding to the second server.

14. The system of claim 13, wherein the management host accesses the memory address of the second server through the extended memory of the management host corresponding to the second server.

15. The system of claim 9, wherein each of the non-transparent bridges comprises two endpoints, and each of the two endpoints comprises the plurality of base address registers.

16. The system of claim 10, wherein the virtual function operates in a zero-copy manner on the management host and the servers.

* * * * *